Dec. 9, 1941.  W. M. CARROLL  2,265,514
LIQUID DISPENSING DEVICE
Filed March 7, 1935  7 Sheets-Sheet 1

INVENTOR
William M. Carroll
By: Cox + Moore
ATTORNEYS

Dec. 9, 1941.  W. M. CARROLL  2,265,514
LIQUID DISPENSING DEVICE
Filed March 7, 1935          7 Sheets-Sheet 2
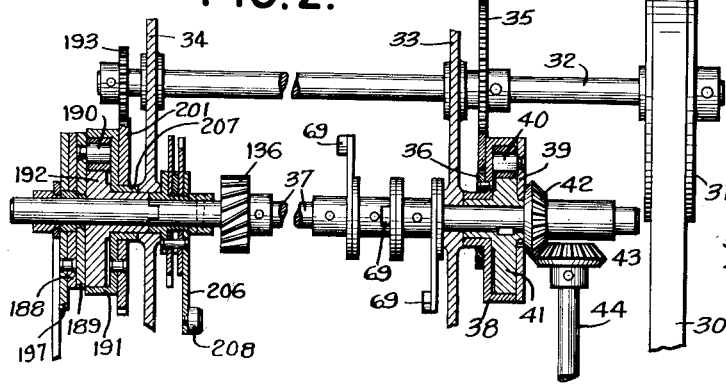
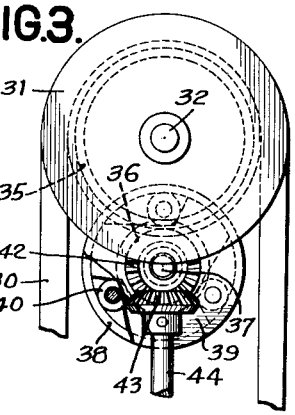
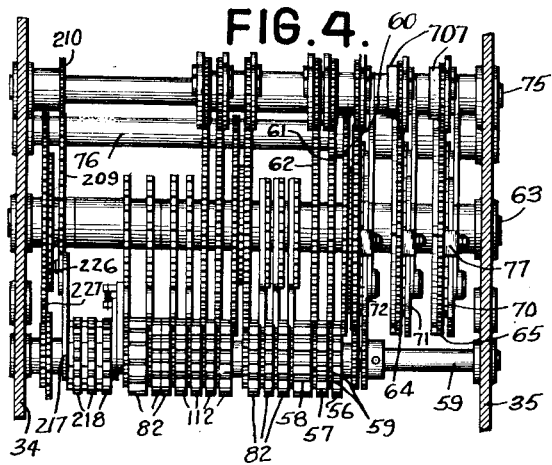
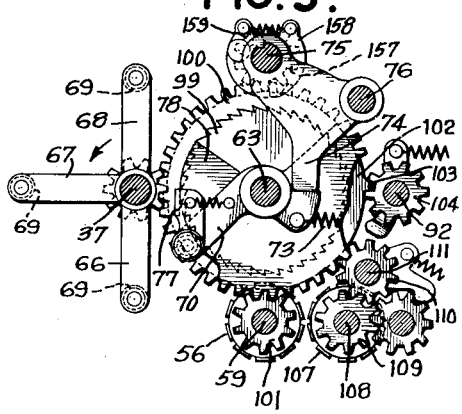
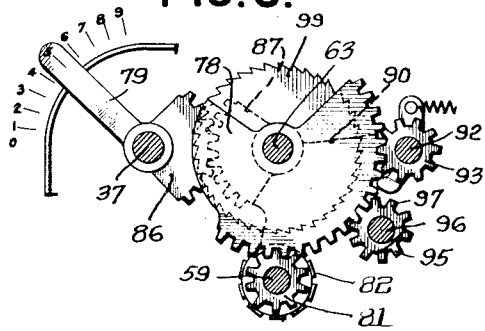
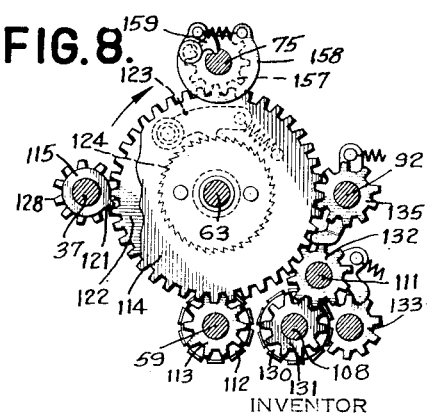
INVENTOR
William M. Carroll
by: Cox + Moore
ATTORNEYS.

Dec. 9, 1941.   W. M. CARROLL   2,265,514
LIQUID DISPENSING DEVICE
Filed March 7, 1935   7 Sheets-Sheet 3

INVENTOR
William M. Carroll
By: Cox & Moore
ATTORNEYS.

Dec. 9, 1941.   W. M. CARROLL   2,265,514
LIQUID DISPENSING DEVICE
Filed March 7, 1935   7 Sheets-Sheet 4

Inventor
William M. Carroll
By: Cox & Moore ATTORNEYS

Dec. 9, 1941.                    W. M. CARROLL                    2,265,514
                            LIQUID DISPENSING DEVICE
                           Filed March 7, 1935           7 Sheets-Sheet 5
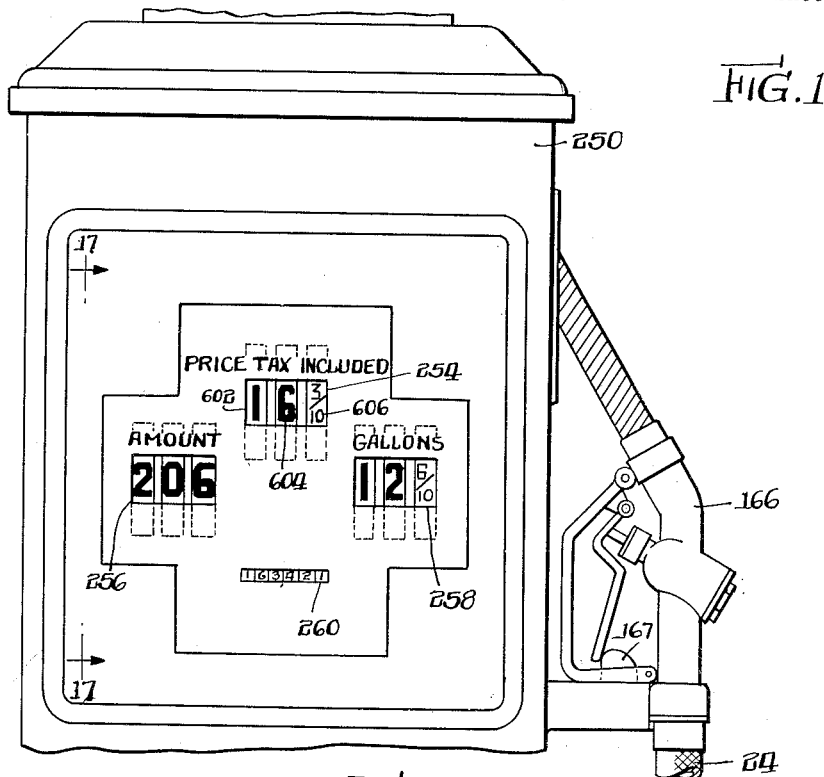
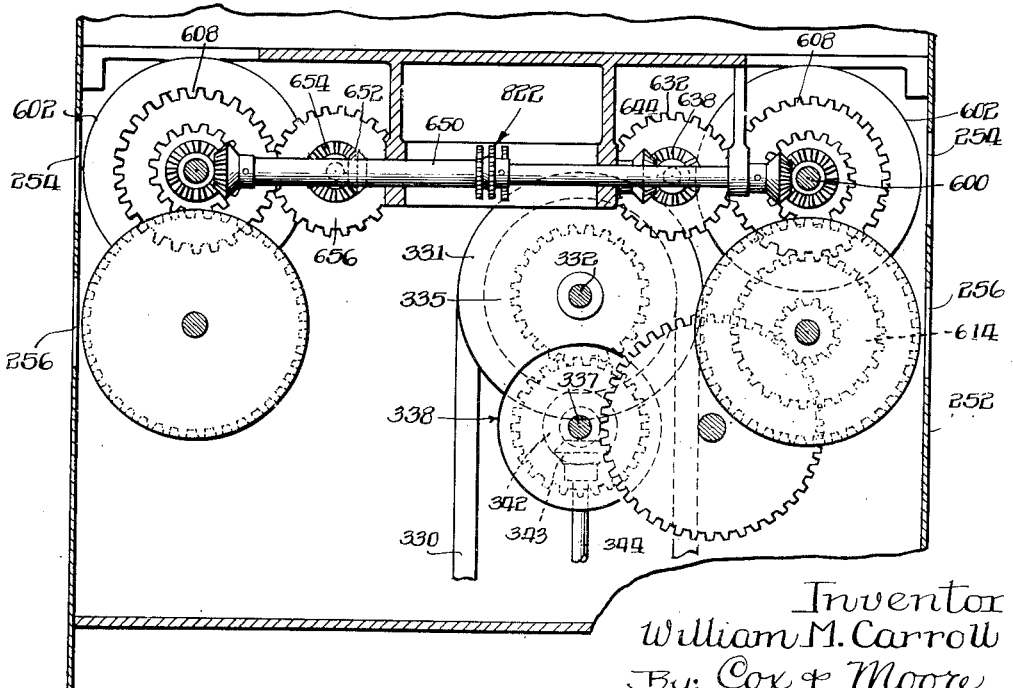
Inventor
William M. Carroll
By: Cox & Moore
attys.

Dec. 9, 1941.  W. M. CARROLL  2,265,514
LIQUID DISPENSING DEVICE
Filed March 7, 1935    7 Sheets-Sheet 6
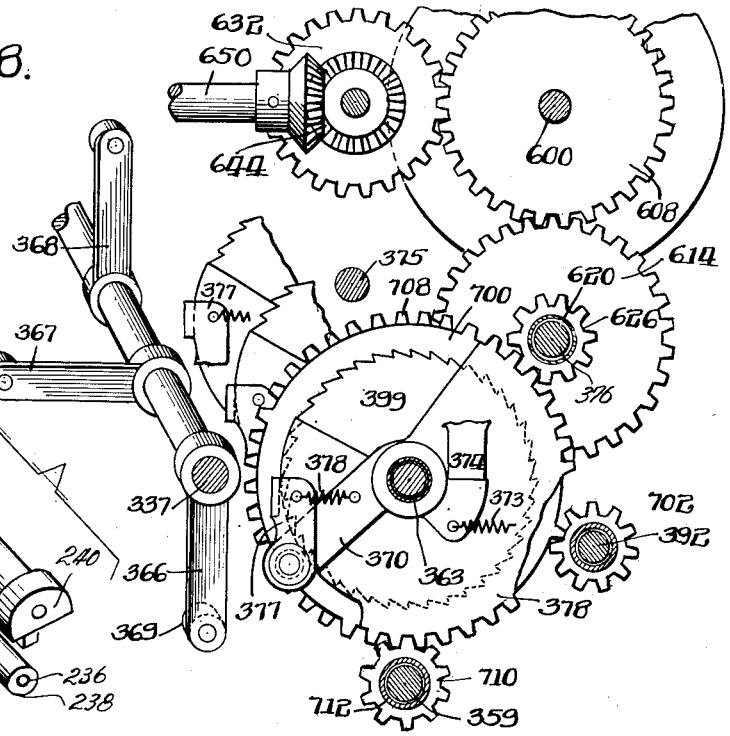
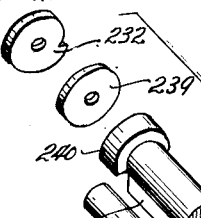
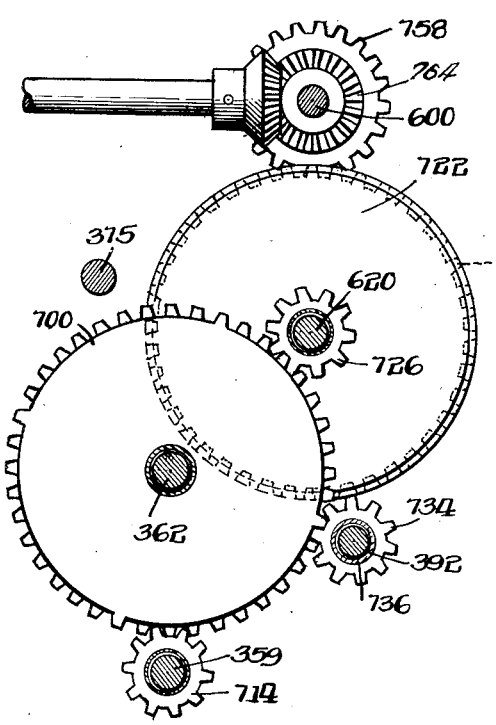
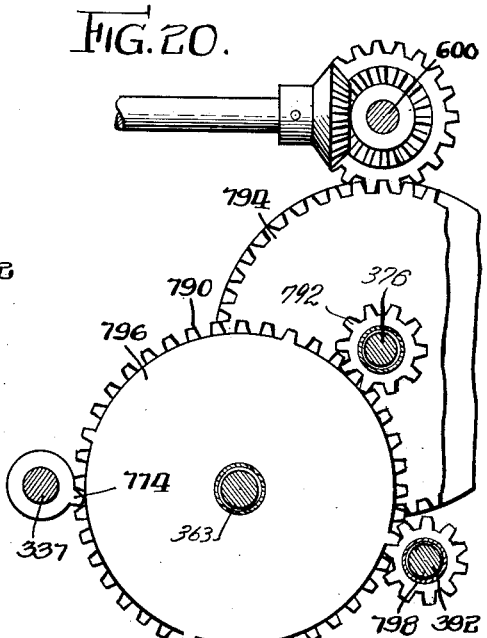
Inventor
William M. Carroll
By: Cox & Moore attys.

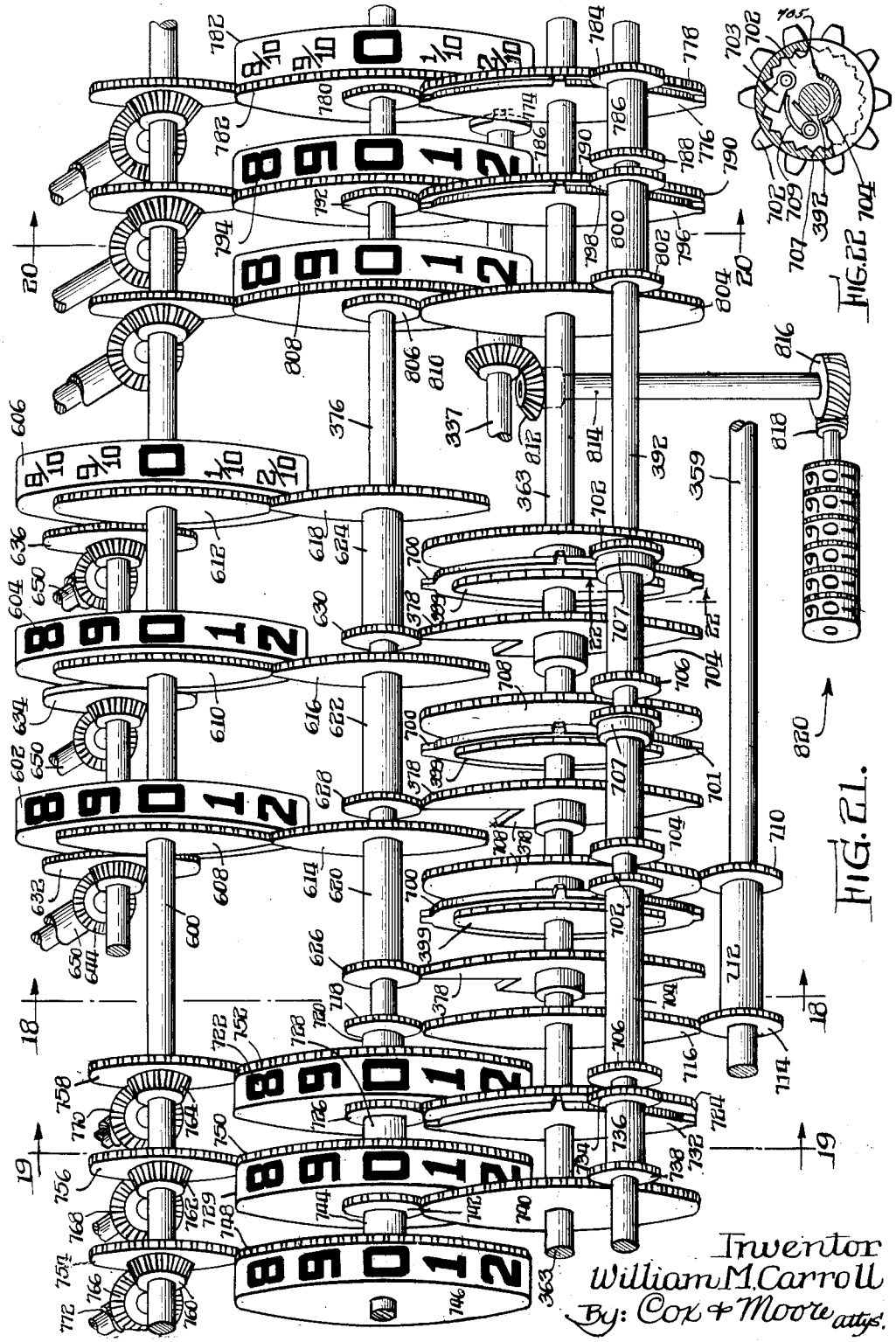

Patented Dec. 9, 1941

2,265,514

UNITED STATES PATENT OFFICE 2,265,514

LIQUID DISPENSING DEVICE

William M. Carroll, Fort Wayne, Ind., assignor to The Wayne Pump Company, Fort Wayne, Ind., a corporation of Maryland Application March 7, 1935, Serial No. 9,760

14 Claims. (Cl. 221—95)

This invention relates to computing liquid dispensing devices and particularly to computing gasoline pumps, and particularly to the type wherein liquid is adapted to flow under pressure through a dispensing line, through a liquid measuring device of the continuously measuring type, and thence through some type of dispensing control valve which is operable to control the dispensing action.

The present application relates to improved features of invention of the device shown in my prior patent wherein I have disclosed a liquid dispensing pump provided with means for obtaining the power for operating the register from the pump and not from the meter, the meter in such instances merely serving as a control. The advantage in my prior construction lies in the fact that it eliminates the necessity of directly connecting the register and driving the register from the meter, which is obviously unsatisfactory in many instances because of the necessity of taking power from the meter to operate the register and whereby the drag resultantly placed upon the meter seriously interfered with its accurate metering function. The power required for driving a register varies considerably during the registering operation, i. e., during transfer operations the power required to drive the register is considerably increased over that required when transferring is not being effected. If the register is driven directly from the meter, not only is there a drag placed upon the meter, but this drag is uneven, and the meter will consequently act as a fluid pump delivering a variable load which destroys the accuracy and reliable functioning of the meter. In my prior patent I therefore disclosed a construction whereby the register was operated by an independent source of power rather than directly from the meter, and I provided, at the same time, a construction whereby the register movement was necessarily directly proportional to the movement of the meter.

One of the objects of my present invention is to provide a construction wherein registering mechanism and/or recording mechanism of the pump are operated from a source of power independent of the driving energy of the meter, wherein any given increment of movement of the meter shaft is utilized in conjunction with the independent prime mover to produce a proportional and corresponding increment of movement of the means for actuating the register.

Another object of my invention is to provide an improved construction of computing pump wherein the registering and/or recording mechanism thereof is operated from a source of energy entirely independent of the meter and wherein during the operation of the meter there is a continuous valve connection between the pump and the registering and/or recording mechanism or between an independent prime mover and the registering and/or recording mechanism.

Another object of my invention is to provide a computing type of dispensing pump wherein the registering and/or recording mechanism is operated from an energy source entirely independent of the operating energy of the meter and wherein a construction is provided which eliminates the necessity of a power reservoir between the prime mover and the register so that the prime mover is directly connected to the register for providing the sole actuating means for the registering and/or recording mechanism and wherein the meter constitutes merely a governing agent.

Yet another object of my invention resides in providing a computing type of pump wherein the registering and/or recording mechanism is actuated by a prime mover providing a source of actuating energy independent of the driving energy of the meter and wherein the thrust imparted to the shaft for operating the registering and recording mechanism is directly proportional to the speed of the meter.

Yet another object of this invention is to provide, in connection with such type of pump, means for accumulating, recording, registering and indicating the amounts of liquid dispensed and the amounts of moneys received, wherein the energy to operate the same is directly derived from a source independent of the meter.

Another object of my invention is to provide a computing and/or recording and registering pump of the above character wherein the computing and accumulating devices, while operating in correspondence with the amount of liquid dispensed, are actuated in such a way that the movement of the measuring device or meter is not utilized as a source of power for operating these devices.

Another object of my invention is to provide a registering device for a liquid dispensing pump wherein the device is operated under the control of the meter but without taking power from the meter.

Still another object is to provide novel means to control the register automatically to accumulate the amounts of the transactions.

A further object is to provide novel means for automatically resetting the indicators.

Another object of my invention is to provide power mechanism for resetting the registers to zero.

A further object of my invention is to provide power means for automatically resetting the registers to zero when the hose nozzle is removed from the hose hook.

Yet another object of my invention resides in providing a computing and registering mechanism for liquid dispensing devices which not only indicates the number of gallons dispensed to any particular customer, but also the price per gallon and also the total amount of money involved in that particular transaction, and wherein the computing and registering devices are driven from the pump motor or some other prime mover whose source of energy is independent of the meter.

Yet another object of my invention resides in providing a computing pump for a liquid dispensing system, such as a gasoline pump, wherein the face of the clock mechanism includes three variable dials, one of which will automatically show the amount of liquid dispensed at any particular transaction, the other of which may be variably set to show the price per unit amount at any particular time and the other of which dial shows the amount of the transaction in dollars and cents.

Another object of my invention is to provide a mechanism for adjusting the unit price indicators which at the same time sets the price computing mechanism so that it will compute at the indicated unit price.

Yet another object of my invention resides in providing a computing gasoline or liquid dispensing pump involving a clock face having at least three sets of dials, the upper dial being arranged to show the prevailing price per gallon including tenths of a cent, and wherein the other two dials are disposed beneath and to each side of the first mentioned dial, one of said set of dials showing the number of gallons, including tenths of a gallon, and the other the total cost of the transaction including dollars, tenths of dollars and cents.

Another object of the invention is to provide an interlocking price per gallon feature, so that when the price per gallon is set up on the indicators, the computing mechanism will automatically be set to compute the total price at the set up price per gallon.

A further object of my invention is to provide printing means which will make a record of each individual dispensing transaction.

Another object of my invention is to provide means to record on a sales slip at the termination of a dispensing operation, such data as the transaction number, date, operator identification symbol, unit and total price, gallons of liquid dispensing and any other necessary or desirable data.

Yet another object of my invention is to provide power means for operating the recording means.

These and other objects of my invention will be apparent from a perusal of the following specification when taken in connection with the following drawings, wherein Fig. 1 is a fragmentary view of the pump having a portion of the casing broken away to show the registering device in position;

Fig. 2 is a detail view of the power shaft and the drive shaft;

Fig. 3 is a detail view in elevation of the shafts disclosed in Fig. 2;

Fig. 4 is a longitudinal sectional view of the accumulator mechanism;

Fig. 5 is a detail view of the accumulator drive mechanism;

Fig. 6 is a detail view of the price setting device;

Fig. 8 is a detail view of the gallons accumulator mechanism;

Fig. 16 is a front elevation of a top portion of the pump showing the arrangement of indicating dials and openings, the same being a modification of the device shown in Fig. 1;

Fig. 17 is a broken away view showing the driving mechanism with the chain and gearing for operating both sides of the meter;

Fig. 18 is a section taken on line 18—18 of Fig. 21 showing the mechanism of the interlock;

Fig. 19 is a section taken on the line 19—19 of Fig. 21;

Fig. 20 is a section taken on line 20—20 of Fig. 21;

Fig. 21 is a diagrammatic perspective of the mechanical interlock and transfer gearing, also showing the three sets of dials and the gearing for operating the same;

Fig. 22 is a detail of the old running clutch drive such as is used between shaft 392 and the gear 702.

Fig. 23 is an exploded view of the printing means.

In general, my invention includes a liquid dispensing pump, specifically a gasoline dispensing pump which includes accumulating and indicating devices operated by power independently of the meter, and therefore, not taking its power from the operating meter, but which is, at the same time, under the control of the meter whereby to accumulate and indicate the quantity of the fluid dispensed, the price per unit and the exact total amount of the transaction. Registering mechanism is provided to register the quantity, price and amount and/or alternatively, printing mechanism may be provided to print the quantity, price and amount on an inserted slip, and on a record slip, which may be retained in the machine. There is also provided a total registering mechanism and/or alternatively a total printing mechanism whereby the total number of gallons sold and the total amount of money received may be registered, and/or alternatively, printed on an inserted slip. The accumulating mechanism is under the control of a price-setting device which, when adjusted, determines the amount to be added into each denominational order accumulator wheel at each rotation of the counter shaft. Mechanisms are also provided to count and print the number of gallons of fluid dispensed and to print the date, consecutive number of the transaction and a character to identify the attendant.

In the present invention I have preferred to show ancillary mechanism whereby the machine is normally locked and set in operation by the removal of the dispensing hose from a suitable support which effects the closing of a switch to start an electrical motor in operation and also whereby removal of the hose in addition initiates a reset operation to reset the indicators, detail money counter and the detail quantity counter to zero, thus clearing these counters of the amounts placed thereon at the last dispensing operation. The resetting is completed quickly and before the attendant is ready to dispense fluid to the next customer. It is obvious that the main features of my invention may or may not be used with these details, as desired.

Figure 1:
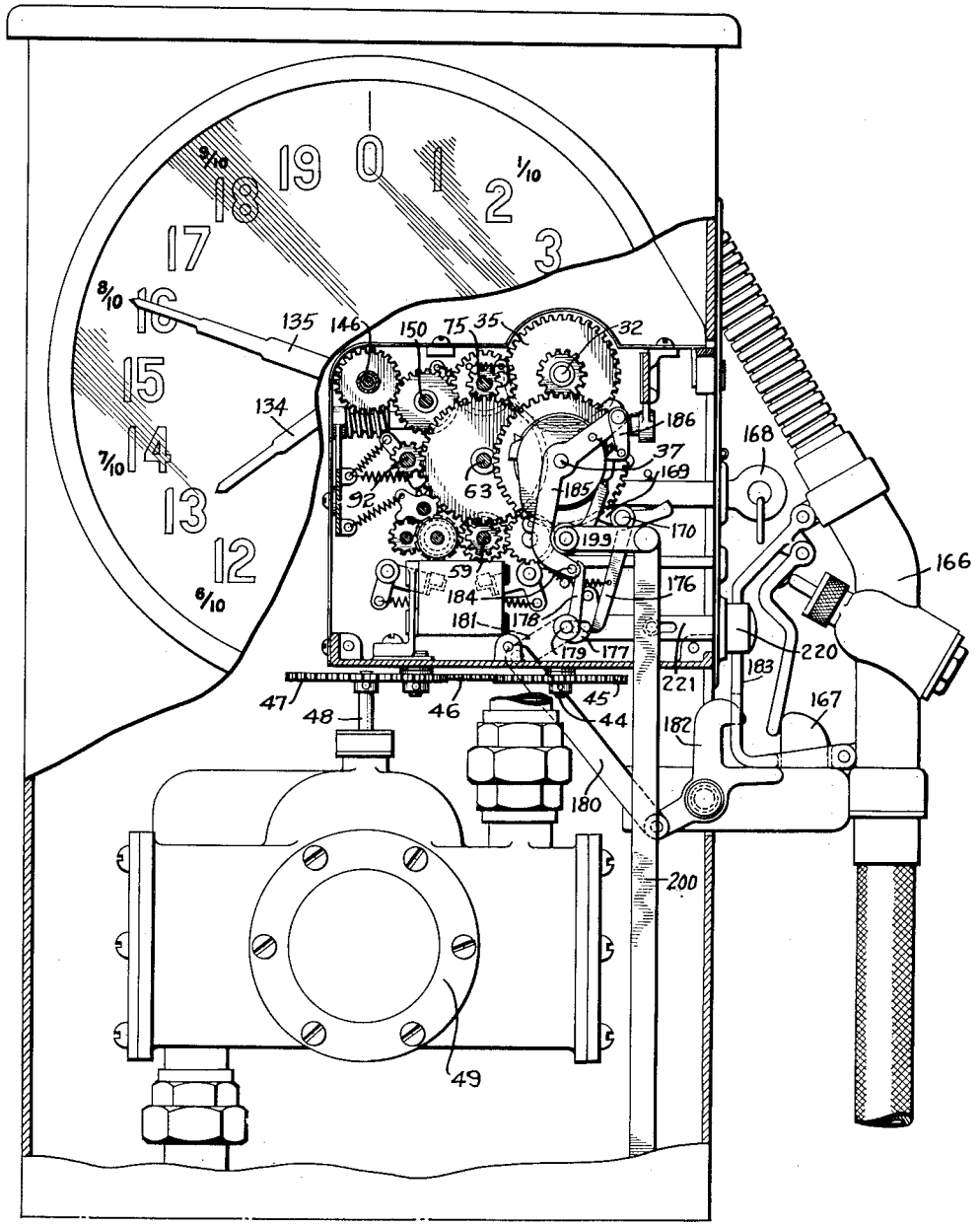
Figure 15:
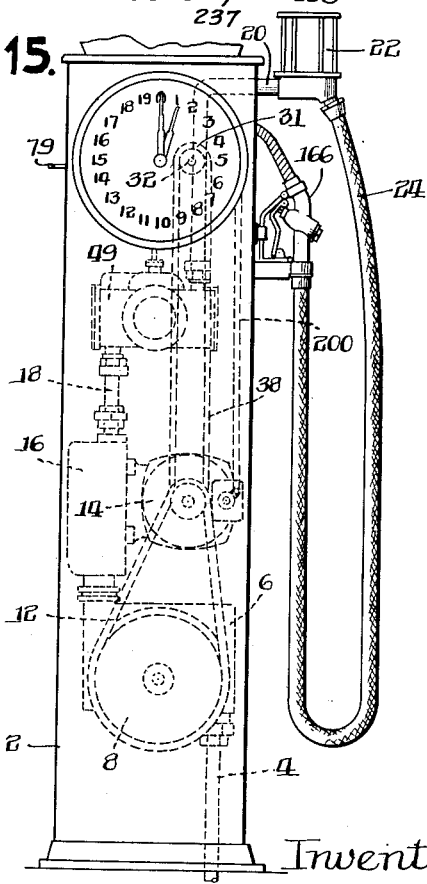
Fig. 15 is a front elevation showing the connection from the pump motor to the computing mechanism for driving the same.

By referring to Figs. 1 and 15 I have shown one particular type of mechanism for carrying out the broad features of my invention. In short, I have shown the device as a gasoline dispensing pump which includes a housing 2 through which a supply line 4 passes upwardly from any desirable source of gasoline supply. This liquid flow line connects with the inlet side of a liquid forcing means, preferably in the form of an electrically driven pump 6 having a pulley 8 driven by a belt 12 from the pulley of a motor 14. The discharge side of this pump discharges into the usual type of air release chamber 16 which, in turn, passes the liquid, such as gasoline, through a pipe 18 through meter 49 which, as will hereinafter more fully appear, may be of any desired type or construction. From the meter the liquid is passed by means of pipe 20 through the customary sight-glass 22, thence through the usual dispensing hose 24 which is provided with a valve-controlled nozzle 166. In addition, the pulley of the electric motor 14 is provided with a belt 30 passing around a pulley or drive wheel 31 on a shaft 32 hereinafter referred to, whereby the accounting mechanism about to be described may be driven from the same electric motor which drives the pump. It may be understood, of course, that one electric motor may be utilized for driving the pump, and a separate electric motor may be utilized for driving the shaft 32 hereinbefore mentioned.

With reference to shaft 32, by inspection of Fig. 2, it will be seen that this shaft is rotatably mounted in frames 33 and 34 suitably supported in the machine in any desired manner. One illustrated construction is shown in Fig. 1. The shaft 32 is operated at a given speed, for example, 90 revolutions per minute. A gear 35 on shaft 32, meshes with another gear 36, which is rotatably mounted on a shaft 37. Gear 36 has secured to its side a clutch shell 38. Likewise rotatably mounted on the shaft 37 is a clutch disc 39 carrying rollers 40 projecting between the clutch shell 38 and a clutch cam 41 which is secured to shaft 37. A beveled gear 42 is secured to the side of the disc 39 and meshes with a beveled gear 43 fast on a vertical shaft 44. Shaft 44 has a gear 45 fast to its lower end. This gear is shown in Fig. 1 as meshing with a gear 46, which in turn meshes with a gear 47 secured to the upper end of meter shaft 48. As is well known, this latter shaft is adapted to be rotated when liquid is flowing through the meter 49. The foregoing train of gears transmits any rotation of the meter shaft 48 to the gear 42 and the clutch disc 39 whereby to rotate this disc 39 in the direction of rotation of the clutch shell 38 and at such a speed that the disc 39 makes one rotation for each one tenth gallon of liquid passing through the meter. Obviously, by suitably proportioning the meter and the gear ratio, other arrangements may be had.

As long as there is no flow of liquid through the meter 49, the shaft 44 and consequently the clutch disc 39 remains stationary with the shell 38 rotating freely over the rollers 40. When, however, liquid flows through the meter the shaft 48, shaft 44 and disc 39 make one rotation for each one tenth gallon of liquid passing through the meter. Rotation of the clutch disc 39 by the meter shifts the rollers 40 bodily into engagement with the clutch cam 41 thereby causing the continuously and relatively fast rotating drive shell 38 to rotate the shaft 37 but always at the same speed as that of the meter shaft 48, i. e., one rotation for each one tenth of a gallon of liquid flowing through the meter. Thus it is obvious that any given increment of movement of the meter shaft results in a proportional and corresponding increment of movement of shaft 37 for driving the computing mechanism and it is also obvious that the thrust imparted to the computing mechanism shaft 37 is directly proportional to the speed of the meter extension shaft 44 and that during the operation of the meter there is a continuous power connection between the pump or pump motor or even from an independent motor, and the registering mechanism, so that the prime mover is directly connected to the register mechanism for providing its sole actuating means. The rotation of shaft 37 is utilized to operate the accumulating, registering, printing and indicating mechanisms, and it will be observed that the power for actuating these mechanisms is derived solely and wholly from the pump motor or other source of power, and is not taken from the meter shaft.

There are four accumulators provided in the machine. They comprise a detail gallon accumulator for the purpose of accumulating the number of gallons of liquid dispensed at each transaction, a detail money accumulator to accumulate the amount of money received at each transaction, a total gallon accumulator to accumulate the total number of gallons dispensed in a given period, and a total money accumulator to accumulate the total amount of money received for a given period. The detail accumulators are adapted to be reset automatically at each operation, whereas the total accumulators are reset at the end of certain periods of business in order to ascertain the totals for that period.

By referring to Fig. 4 it will be observed that the detail money accumulator includes a plurality of denominational order printing wheels 56, 57 and 58, rotatably mounted on a shaft 59 supported in the frames 34 and 35. Wheel 56 is the one cent wheel, wheel 57 is the ten cent wheel and wheel 58 is the one dollar wheel. Attached to each one of these several wheels is a gear which meshes with another gear on a counter shaft 63. There are three of such gears on the counter shaft—60, 61 and 62. An actuator is provided to drive the gear 60 for the one cent wheel 56, the amounts being accumulated on the higher order wheels 57 and 58 by transfer mechanism.

Bearing in mind that the liquid is measured in one tenth gallons, the amount of money received is likewise accumulated in one tenths of the price per gallon. For instance, assuming that the price is $0.163 per gallon, $0.0163 is accumulated for each one tenth of a gallon dispensed. In order to accumulate this amount, two additional gears 64 and 65 are provided to accumulate the tenths and hundredths of cents respectively. However, since it is not desired to indicate or print these fractions of a cent, no printing or accumulator wheels are associated with these gears. The hundredths of a cent order transfers to the tenth of a cent order, and the latter transfers to the one cent order.

The actuators include arms 66, 67 and 68 for the hundredths of cents, tenths of cents and the cents order. These arms are secured to, in spaced relation, along the drive shaft 37 (see Figs. 4 and 5) and are spaced about its shaft 90 degrees apart.

Each of the arms 66, 67 and 68 carries a roller 69, which as the shaft 37 is driven in the manner hereinbefore described, in a counter-clockwise direction, successively contacts arms 70, 71 and 72. These arms are pivotally mounted on and in spaced apart relation along the shaft 63 whereby to rock these arms clockwise through angles of 90 degrees. As soon as the rollers 69 escape their respective arms 70, 71 and 72, springs 73 restore said arms to their normal positions, when they are stopped by the frame 74, mounted on the reset shaft 75, and a shaft 76. Each of the arms 70, 71 and 72 carries a spring-pressed pawl 77 having an ear bent at right angles thereto, adapted to rest on a periphery of a price setting segment 78. Three segments 78 are provided, one for each of the hundredths, tenths and units of cents denominational orders. These segments are set manually by levers 79 mounted on the shaft 37, and which levers 79 have integrally formed therewith segments 86, meshing with segments 87, 88 and 89 (see Fig. 7), on the shaft 63. The segment 87 is secured to a segment 90 which meshes with the pinion 91 fast onto shaft 92 on which is also fast a pinion 93 meshing with teeth on the segment 78, or the hundredths of cents segment. The segment 88 is secured to the side of a segment 94, which meshes with a pinion 95 fast on a shaft 96 having a pinion 97 fast thereon, meshing with the tenths of cents segment 78. The segment 89 is secured to a segment 98 fast on the shaft 63 to which shaft is also fast a segment 78 for the cents denomination order. By means of the levers 79 and the mechanisms associated therewith, the segments 78 may be individually adjusted according to the current price per gallon of the liquid dispensed.

Figure 7:
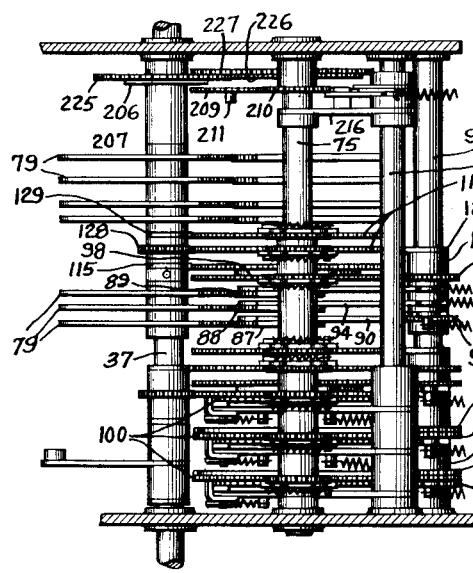
Fig. 7 is a top plan view of the accumulator mechanism.

In some instances I desire to print the price per gallon on a sales slip. To accomplish this, the segments 78 (Fig. 7) mesh with gears 81 (see Fig. 6) attached to type wheels 82 on shaft 59. These type wheels are set according to the adjustment of the levers 79 to print the price per gallon. Referring to Figure 7 of the drawings, it will be noted that seven levers 79 are shown and the functions of only the lower three have been hitherto described. It will be recalled that these levers set the price computing mechanism and set printing wheels 82 so that the price per gallon will be printed on the sales slip. The upper four levers serve to set up other indicia which are to print data on the sales slip.

The uppermost lever operates a sector 78 similar to that shown in Figure 6, which in turn operates the wide printing wheel 82' shown in Figure 4. This wheel carries the abbreviated names of the months in a year and serves to print one of the same upon each ticket printing operation. The second and third levers from the top in Figure 7 operate sectors 78 to operate the narrow type wheels 82' of Figure 4 to set up the day of the month, so that this data too, will be printed on the sales slip.

A fourth lever 79 is provided and through a sector 78 sets up the type wheel 112'. This wheel carries operator identification characters and is set prior to each operation of the dispensing apparatus so that an indication of the particular operator involved in the transaction will be printed upon the sales slip issued in terminating the transaction. The pawl 77 carried by the arm 70 (see Fig. 5) is adapted to cooperate with a ratchet 99 secured to a gear 100, both of which are mounted to rotate freely on shaft 63. It will be remembered that the shaft 37 (Fig. 5) makes one complete counter-clockwise rotation for each tenth of a gallon dispensed, and at which rotation the rollers 69 carried by the arms 66, 67 and 68 successively engage their corresponding arms 70, 71 and 72 to rock these arms clockwise through 90 degree movements. The pawls 77 travel idly on the smooth peripheries of the segments 78 until the pawl drops off such smooth edge, whereupon said pawls engage and rotate the ratchets 99 therewith a distance equal to the remainder of travel of the arms 70 to 72 inclusive. For instance, if the lever 79 is set at the "5" position, the pawl 77 will pick up the corresponding ratchet 99 and rotate the ratchet and gear 100 five spaces. When the roller 69 escapes the arm 70, the spring 73 restores said arm to its normal position, pawl 77 moving idly over the ratchet teeth to its position on the periphery of the segment 78.

The gear 100 for the one cent order meshes with the gear 101 secured to the printing totalizer wheel 56 (Figure 5) that is adding "5" onto this wheel. Assuming that the three price levers 79 are set to "1", "6", "3"—representing the price of 16.3¢ per gallon, the segments 78 are set correspondingly and at each rotation of the shaft 37, "3" will be added to the hundredths of a cent gear 100, "6" will be added onto the tenths of a cent gear 100, and "1" will be added onto the one cent gear 100 and consequently on the accumulator wheel 56. When the shaft 37 has made ten rotations, that is, when one gallon of liquid has been dispensed, the hundredths of cents order has been reciprocated ten times, and "3" has been added onto the hundredths of cents wheel ten times, causing three transfers to the tenths of cents wheels, "6" has been added onto the tenths of a cent wheel ten times, causing six transfers to the cent wheel, and "1" has been added onto the one cent wheel ten times, causing one transfer to the ten cent wheel. The wheels now stand at 00.1630.

The transfer from a lower denominational order to the next higher order is effected by a disc 102 (Figure 5) secured to the side of the gear 100. This disc has four projections 103 equally spaced about its periphery. The projections 103 cooperate with a gear 104 rotatably mounted on the shaft 92 and secured to one end of a sleeve 105 (Fig. 7) having a gear 106 meshing with the gear 100 of the next higher order to advance the latter gear one space when the next lower order gear 100 passes from "9" to "0".

The total money accumulator includes a plurality of printing accumulator wheels 107 (Fig. 5) mounted on a shaft 108, each wheel having a gear 109 secured thereto meshing with an intermediate gear 110 on a shaft 111 which gears 110 mesh with their corresponding actuator gears 100. Thus the differential movements of the gears 100 are transmitted to the wheels 107 to add thereon the amounts added onto the detail money wheels 56. It is to be understood that no wheels 107 are provided in the denominational orders pertaining to the fractional parts of one cent. Transfer from one order to the next higher order is accomplished by means of the well known Geneva transfer device. Mechanism is provided to disengage the total accumulator from the actuator gears 100 when the item or detail accumulator is reset to zero in a manner to be hereinafter described.

Item and total accumulators are also provided to accumulate the number of gallons dispensed at each particular transaction and to accumulate the total number of gallons dispensed during a given period. The item accumulator includes printing accumulator wheels 112 (Fig. 8) mounted on the shaft 59 and having gears 113 secured thereto which gears mesh with large gears 114 on the shaft 63. The tenths of units order gear 114 only is advanced one space each time the shaft 37 makes one rotation. This rotation of the gear 114 advances the tenths of units wheel 112 one space to add one-tenth of a gallon on the accumulator. The tenths of units gear 114 is operated by a disc 115 having a single projection 121 on its periphery. The projection 121 at each rotation of the shaft 37 advances a gear 122 one space. The gear 122 carries a pawl 123 which cooperates with a ratchet 124 secured to the tenths gear 114. By means of this pawl and ratchet the movement of the gear 122 is transmitted to the tenths gear 114 which in turn advances the tenths wheel 112 one step for each rotation of the shaft 37.

The tenths of units gear 114 meshes with a gear 125 on the shaft 92, the gear 125 being fast on a hub 126 (Fig. 7) to which is also fast a transfer disc 127 having a single tooth thereon cooperating with the units gear 114 at every rotation of the gear 125 or when the wheel 112 has been rotated ten spaces the single tooth on the disc 127 advances the units gear 114 one space. Similarly the units gear 114 meshes with a gear 128 on the shaft 37, the gear 128 being hubbed to a disc 129 having a single tooth thereon cooperating with the tens gear 114 to transfer from the units order to the tens order.

The total gallons accumulator includes printing accumulator wheels 130 on the shaft 108, said wheels 130 having gears 131 secured thereto which mesh with gears 132 meshing with their respective denominational order gears 114. Transfer in this totalizer is effected by the usual Geneva transfer gears 133.

Indicating mechanism is also provided to indicate the number of gallons and fractions of a gallon dispensed at each transaction. These indicators are adapted to be reset to zero automatically at each operation of the register.

Figure 9:
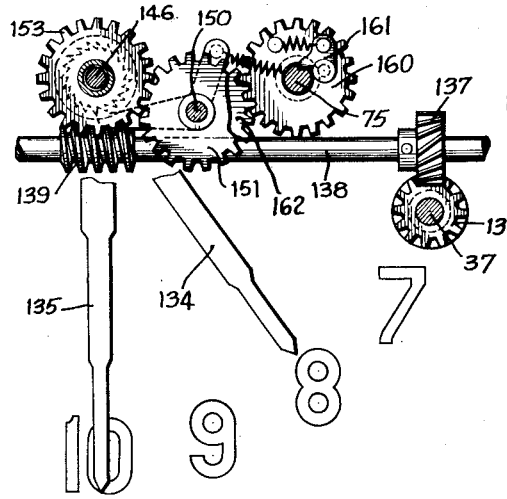
Fig. 9 is a detail view of the indicator mechanism.

The indicating mechanism includes a hand 134 (Fig. 9) to indicate the number of gallons and a hand 135 to indicate the fractional parts of a gallon dispensed. Only one pair of indicator hands 134 and 135 is shown, provision being made to operate indicator hands on both sides of the machine so as to be visible in opposite directions.

Figure 10:
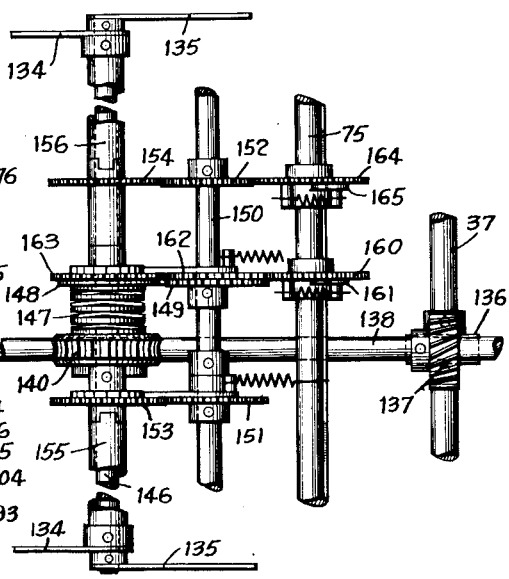
Fig. 10 is a top plan view of the mechanism shown in Fig. 9.

The indicators are driven from the shaft 37 which makes one rotation for each tenth of a gallon dispensed. A gear 136 (Figs. 9 and 10) fast on shaft 37 meshes with a gear 137 fast on a shaft 138 disposed first above shaft 37 and at right angles thereto. A worm 139 fast on shaft 138 meshes with a worm gear 140 loosely mounted on a shaft 146. The ratios of the gears 139 and 140 is such that one complete rotation of gear 139 imparts one-tenth of one rotation to gear 140. By means of a multiple disc clutch 147 (Fig. 10) the gear 140 rotates a disc 148 secured on the shaft 146 and consequently the shaft 146 which carries at each end a hand 135. These hands are rotated with the shaft 146 one-tenth of a rotation for each tenth of a gallon dispensed.

The disc 148 has a single projection on its periphery, which at each rotation engages a tooth on a gear 149 secured to a shaft 150 and rotates this shaft one-twentieth rotation. Two gears 151 and 152 also fast on the shaft 150 mesh with gears 153 and 154 respectively connected to the hands 134 by sleeves 155 and 156, thus transmitting the movement of the gear 149 to these hands to advance said hands 134 one-twentieth rotation for each complete rotation of the hands 135.

Referring to Figure 1 it may be noted that the dial is divided into 20 spaces for indicating the even gallons and 10 spaces for indicating the fractional parts of a gallon.

In connection with the herein described mechanism, I prefer, although not necessarily so, to provide means for simultaneously resetting the indicator hands and the item accumulator to zero at the beginning of each dispensing operation, and in such a manner that the resetting is effected by a single rotation of reset shaft 75. It will, of course, be appreciated that as to certain broad features of my invention, they are wholly independent of the resetting mechanism and may be utilized on dispensing devices having no resetting mechanism.

However, in the present instance, I have disclosed resetting mechanism wherein, it will be noted, that each of the gears 100, as shown in Fig. 5, and each of the gears 114, as shown in Fig. 8, for the item money accumulator and for the item gallons accumulator, respectively, meshes with gears 157 loosely mounted on the reset shaft 75. The disc 158 secured to the side of each of the gears 157 carries a pawl 159 adapted to cooperate with a longitudinal groove in the reset shaft 75. At the proper time, and by mechanism which is to be described later, the shaft 75 receives one counterclockwise rotation (see Fig. 5), during which the groove picks up all of the pawls 159 and rotates the gears 157 and consequently the gears 100 and 114 to zero position. The gears 100 and 114 transmit their resetting movement to the accumulator wheels 56, 57 and 58, and 112 to set the latter wheels to zero.

In order to reset the indicators 135 to zero a gear 160 (Figure 10), rotatably mounted on the shaft 75, carries a pawl 161 adapted to cooperate with the groove in said shaft. The reset shaft 75 rotates in a clockwise direction as viewed in Fig. 9, during which the groove therein picks up the pawl 161 and gear 160 rotating these members to zero position. The rotation of the gear 160 is transmitted by an intermediate gear 162 loose on the shaft 150, to a gear 163 secured to the disc 148, which it will be remembered, is secured to the shaft 146 carrying the hands 135. This rotation of the shaft 146 advances the hands 135 forwardly to zero position.

A similar device is employed to bring the hands 134 to zero. A second gear 164 meshing with the previously described gear 152, carries a pawl 165 adapted to cooperate with the grooved shaft 75. Obviously when the shaft 75 rotates and the groove picks up the pawl 165 turning the gear 164 to zero position, the movement is communicated to the gear 152, gear 154, shaft 150, gears 151 and 153 to advance the hands 134 to zero position.

The mechanism will now be described for effecting a single rotation to the reset shaft 75 for the purpose of resetting the accumulators and indicators to zero. A resetting operation occurs at the beginning of each dispensing operation and is initiated by removal of the dispensing hose fitting 166 (Fig. 1) from its hook 167. The hose fitting 166 is normally locked against unauthorized removal and is unlocked by the insertion of a key 168 which contacts an arm 169 fast on a shaft 170 and rocks said shaft counterclockwise.

Figure 11:
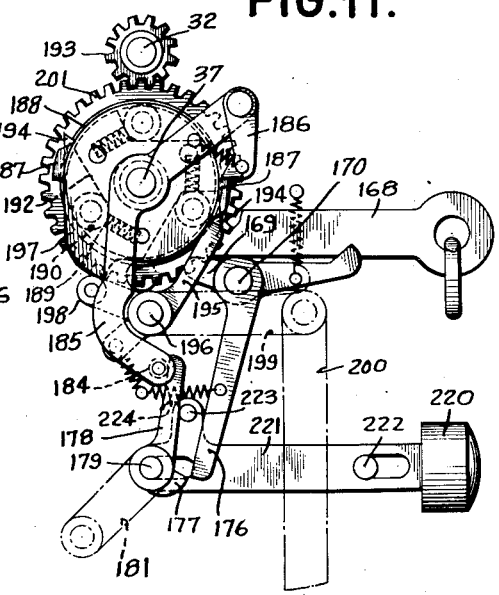
Fig. 11 is a detail view of the resetting and printing drive mechanism.

Also fast on the shaft 170 (Fig. 11) is a locking finger 176 normally in position with its free end in path of a projection 177 on an arm 178 fast on a shaft 179. The counterclockwise movement of the shaft 170 carries the locking finger 176 out of the path of the projection 177, thus, permitting the arm 178 and shaft 179 to rock counterclockwise.

A link 180 (Fig. 1) connects an arm 181 also fast on the shaft 179 to one arm of a lever 182 having its other arm shaped to form a hook which is adapted to cooperate with a slot in the fitting guard 183 upon removal of the hose fitting 183 from its hook 167 the lever 182 is rocked slightly counterclockwise which movement is transmitted by the link 180 to the arm 181 and shaft 179 rocking these members, together with the arm 178 counterclockwise. The arm 178 is normally in contact with a roller 184 (Fig. 11) on one arm of a lever 185 pivoted on the shaft 37. The outer arm of this lever carries a pawl 186 adapted to cooperate with one of two projections 187 on the periphery of a disc 188 (see also Fig. 2). Rotatably mounted on the shaft 37 adjacent the disc 188 on the shaft 37 is a disc 189 carrying clutch rollers 190 projecting between a clutch shell 191 and a clutch cam 192 on the power driven shaft 37. Secured to the clutch shell 190 is a gear 201 meshing with a gear 193 fast on the shaft 32.

The disc 189 is provided with two projections 194 one of which normally cooperates with a restraining dog 195 pivoted on a stud 196 and held in contact with the peripheries of the discs 188 and 189 by a spring.

As stated above, removal of the hose fitting from its hook rocks the lever 185 slightly clockwise. At this movement the pawl 186 being in engagement with a projection 187 rocks the disc 188 also clockwise. The leading edge of the projection 187 is beveled and rocks the dog 195 clockwise out of the path of the projection 194 thus releasing disc 189 for rotation under action of the clutch springs to render the clutch effective.

The movement of the lever 185 also closes a switch (not shown) to start the motor. Secured to the disc 188 (Fig. 11) is a cam 197 with which cooperates a roller 198 carried on one arm of a lever 199 pivoted on the stud 196 and having its other arm connected by a link 200 to the switch operating mechanism (not shown).

The clockwise movement of the lever 185 is transmitted by its pawl 186 rocks the disc 188 and also the cam 197 clockwise at which movement the cam 197 moves from under the roller 198 permitting the lever 199 to rock clockwise lowering the link 200 to close the switch (not shown) thus starting the electric motor. The motor rotates the shaft 32 and through the gears 193 and 201 drives the clutch shell 191 and, since the clutch is now effective, the clutch cam 192.

Figure 12:
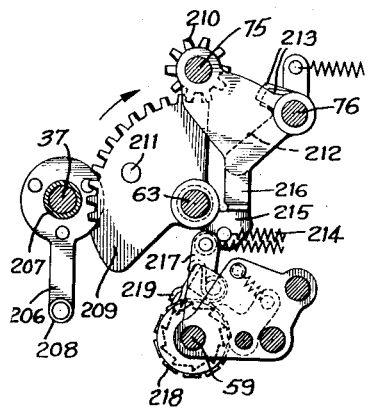
Fig. 12 is a detail view of the resetting mechanism.

The clutch cam 192 has an arm 206 secured to the opposite end of its hub 207 which arm carries a roller 208 adapted to cooperate with a segmental gear 209 (Figs. 7 and 12) pivoted on the shaft 63. The segment 209 meshes with a gear 210 fast on the reset shaft 75. As the arm 206 rotates in a counterclockwise direction (Fig. 12) the roller 208 picks up and rotates the segment 209 one fourth turn in a clockwise direction. This movement is sufficient to impart to the gear 210 and reset shaft 75 one complete counterclockwise rotation to reset the accumulators and indicators to zero in the manner described above.

As the segment 209 nears the end of its clockwise travel a stud 211 (Fig. 7) thereon strikes an arm 212 on the shaft 76 rocking this arm slightly counterclockwise to bring pawls 213 into engagement with the teeth of segment 209 to act as a positive stop for said segment.

With reference to Fig. 7 it will be noted that the four levers 79 shown in the upper part of the figure are arranged so that the operator by shifting the same can set up the identification character of the particular transaction and the day and the month printing wheels.

As soon as the roller 208 moves out of contact with the segment 209 a spring 214 restores it counterclockwise to normal position where the segment is stopped by a projection 215 thereon striking a stop member 216 mounted on the shafts 75 and 76.

The oscillatory movement of the segment 209 is made use of to operate a consecutive counter one step at each operation of the resetting device. The projection 215 on the segment 209 cooperates with a roller on an arm 217 mounted on the shaft 59 on which are also mounted consecutive counter printing wheels 218. Lined pawls 219 carried between the arm 217 and another arm (not shown) coact with ratchets on the wheels 218 to advance the wheel of lowest order one step at each resetting operation.

The resetting operation is completed in one-half of one rotation of the clutch cam 192 and disc 189. After the projection 187 has passed under the dog 195, said dog resumes its position on the periphery of the discs 188 and 189 so that when these discs have completed 180 degrees of rotation the other projection 194 strikes the end of the dog thereby disengaging the clutch and stopping the rotation of the clutch cam 192.

The resetting operation is effected very quickly and occurs between the time the hose fitting is removed from its hook and the dispensing operation. After the dispensing operation the hose is replaced on its hook and the attendant presses a button 220 which serves to manually rock the lever 185 to effect a second 180 degrees rotation of the clutch cam 192 and the arm 206. At this half rotation the arm 206 turns idly to the position in which it appears in Fig. 12, while other mechanism functions to operate the printing mechanism.

The stem 221 of the button 220 is slidably mounted on the shaft 179 (Fig. 11) and on a stud 222. The stem 221 carries a stud 223 which upon operation of the button, engages and rocks counterclockwise an arm 224 fast on the shaft 179.

This rocks the shaft and the arm 178 which in turn rocks the lever 185 for the purpose above set forth.

A gear 225 (Fig. 13) secured to the hub 207, which carries the arm 206 (Fig. 12) rotates idly at the first movement of the clutch cam 192. However, when the hub 207 is rotated under the control of the button 220, the gear 225 meshes with and rotates a gear 226 on the shaft 63. A gear 227 secured to the gear 226 meshes with a gear 228 on the shaft 59. A gear 229 secured to the gear 228 meshes with a gear 230 on a shaft 231. Secured to the gear 230 is a hammer operating cam 232 and a printing electro 233. The cam 232 cooperates with a stud 234 projecting from a hammer arm 235 pivoted on a shaft 236. A spring 237 holds the stud 234 against the periphery of the cam 232. A platen roller 238 rotatably mounted on the shaft 236 cooperates with the electro 233 to print on an inserted record material. The hammer arm 235 carries a platen 239 which is adapted to be thrown sharply against all of the type wheels mounted on shaft 59 twice at each operation to take two impressions therefrom.

Figure 13:
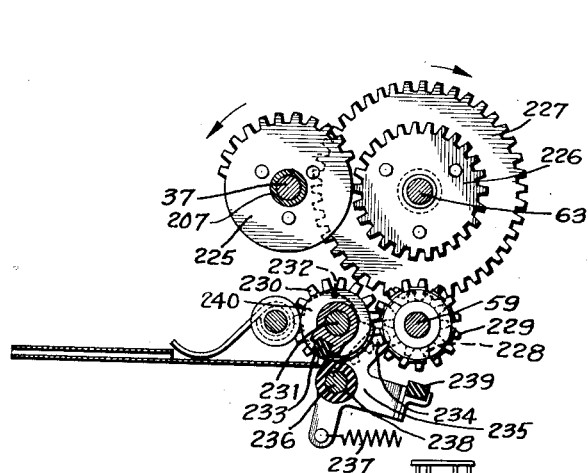
Fig. 13 is a detail view of the printing mechanism.
Figure 14:
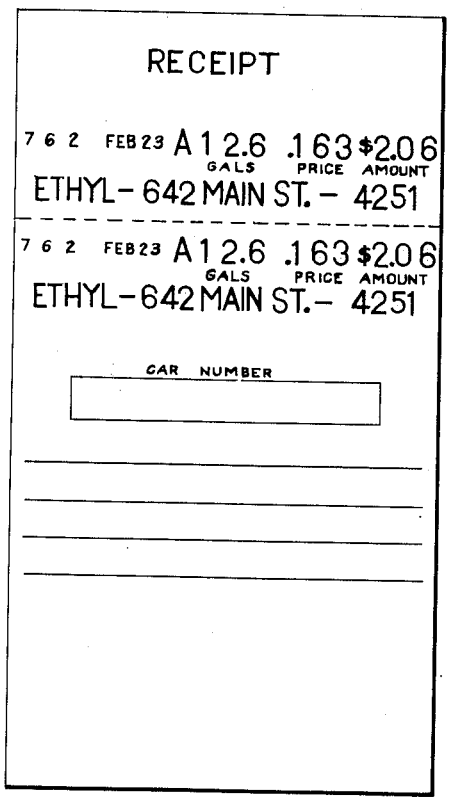
Fig. 14 is a facsimile of the slip printed in the machine.

The ratio of the above described train of gears is such that the gear 230, cam 232 and electro 233 receive two complete clockwise rotations at each effective operation of the gear 225. Shortly after the cam 232 starts its rotation it releases the hammer arm 235 to its spring 237 to effect an impression from the type wheels. After this impression is made, feed discs 240 on the shaft 231 and operated by the gear 230 becomes effective to feed the record material toward the left (Fig. 13). The feed discs each have a flattened portion as shown by the dotted oblique line in Figure 13. This flattened portion occupies a position adjacent to platen 238 at the termination of the printing operation, thus leaving a space for the insertion of the ticket from the left at the beginning of a dispensing operation. It is also to be noted that this flattened portion permits movement of the actuating cam without a corresponding feeding motion of the ticket, thus permitting the platen 239 to take an impression while the ticket is motionless.

Platen 238 also cooperates with the discs 240 as a complementary feed roll.

It is contemplated that, instead of inking the register wheels, a ticket having a carbon sheet overlying it will be used, although any desirable form of inking mechanism may be used as an alternative. Near the end of this feeding movement the electro 233 effects its printing on the record material.

These operations are repeated at the second rotation of the gear 230 to effect a second impression on the record material which may then be severed between the imprints part being given the customer as a receipt and the remaining part retained.

Any suitable means may be provided to print the total amounts and to reset the total accumulators to zero, none therefore, being shown herein.

In Figs. 16 to 21 I have illustrated a possibly preferred type of computing pump mechanism wherein instead of printing the items as to the price per gallon of liquid dispensed, the number of gallons of liquid dispensed and the total cost of the gallons dispensed at that price, I have provided mechanism for registering or visually indicating the same. For instance, in Fig. 16 of the drawings I have shown the upper portion of one type of liquid dispensing housing 250 which is substantially like the housing shown in Fig. 15, and wherein the general mechanism enclosed within the housing is the same as shown in Fig. 15, the main difference being that in Fig. 16 the items above-noted are registered on the clock face instead of printed and wherein the mechanism for altering the price per gallon dials is accomplished, not by the levers 79 shown in Fig. 6, but is accomplished by manually turning the price per gallon dials themselves. In this manner a very easy and mechanical adjustment may be made.

Referring to Fig. 16 it will be noted that the clock face 252, preferably comprises an upper opening 254 carrying the legend thereabove "Price—Tax included"; to the left and below the clock face is likewise provided another window 256, with the legend thereabove "Amount," and to the right of this there is provided a third window 258 with the legend thereabove "Gallons." If desired, immediately below these three windows, another window 260 may be provided, through which the totalizer dials are viewable.

Fig. 17, being a view taken on line 17—17 of Fig. 16, shows at the right hand side thereof the clock face 252 with the price per gallon window 254 and the amount window 256 with their respective dials immediately opposite the same. The other window 258, not shown in Fig. 17 would be beyond and is identical with window 256. For purposes of convenience, the mechanism and windows are duplicated on each side of the pump so that a price per gallon window 254 and the amount window 256 and gallons window 258 will be shown on the other or opposite clock dial of the pump standard. In this construction, and for a comparison with Figs. 2 and 3 of the drawings, and for the purpose of convenience, I shall number the various elements of this construction that are common with the constructions of Figs. 2 to 15 inclusive, the same, except that I shall put an additional digit before each number. In other words, I shall call the shaft 32 of Fig. 2, when placed in Figs. 17 to 21 inclusive "332". Thus referring to Fig. 17, it will be noted that shaft 332 is mounted in suitable bearings in the housing 250 and carries a suitable pulley 331 adapted to be driven by a belt 330, which in turn is driven from the pump motor 14, all as shown in prior Fig. 15, hereinbefore described. On this same shaft 332 is mounted the gear 335, similar to gear 35 of Fig. 2, and meshing with a gear like 36 of Fig. 2 on the shaft 337. In other words, the construction of Fig. 17, insofar as this drive is concerned, is identical with that of Fig. 2, whereby the shaft 344 is driven and in the manner as shown in Fig. 1, to drive the shaft 337. By a comparison of Fig. 18 with Fig. 5, it will be seen that the constructions provided are in the main, substantially alike, except that no printing wheels are provided for this modified embodiment. By referring to Fig. 18 and by comparison of the practically similar construction of Fig. 5, it will be evident that when the shaft 337 turns in a counterclockwise direction, it will turn the arms 366, 367 and 368 in the same direction, and the rollers of these arms will successively contact their respective arms 370, 371 and 372, which are pivotally mounted on shaft 363 to rock these arms clockwise—through angles of 90 degrees. As soon as the rollers 369 on these arms escape their respective arms 370, 371 and 372, springs 373 restore the arms to their normal positions, at which position they are stopped by frames 374 mounted on reset shaft 375. Each of these arms 370, 371 and 372 carries a spring-pressed pawl 377 having an ear bent at right angles thereto, adapted to rest on the periphery of the price-setting segment 378 (see Figs. 18 and 21). Three segments 378 are provided, one for each of the hundredths, tenths and units of cents denominational orders. Instead of setting these segments manually by means of the levers 79, as shown in Fig. 6, in the present instance these segments are set directly by means of the price per gallon dials as shown clearly in Fig. 21. In order to accomplish this setting a shaft 600 is disposed substantially above shaft 376 and this shaft carries loosely thereon three price per gallon dials 602, 604 and 606. The peripheries of these dials are provided with proper indicia which are viewable through the price per gallon windows 254 of the opposite clock faces. There are two sets of these price per gallon dials, one on each side of the clock face. Two of these dials are provided with numerals from "0" to "9" while the extreme right one is preferably provided with fractional numerals from "0" and grading up one tenth up to nine tenths. Obviously other indicia may be utilized if desired. Each one of the dials is provided with a gear 608, 610 and 612, each gear rigidly rotating with its dial and each one of these gears in turn meshes with another gear 614, 616 and 618, each of said latter gears being rotated upon a sleeve 620, 622 and 624. Each of these sleeves carries a small gear. Sleeve 620 carries a small gear 626; sleeve 622 carries a gear 628 and sleeve 624 carries a gear 630. Each of these gears such as 614, 616 and 618, together with its sleeves 620, 622 and 624, and its smaller gears 626, 628 and 630 rotates loosely on shaft 376. The series of gears 626, 628 and 630 in turn mesh with the respective segments 378 on the shaft 363 as hereinbefore described, whereby upon turning in one of the price per gallon dials, the corresponding segments 378 will be shifted a corresponding amount on the shaft 363. Each gear 608, 610 and 612 likewise meshes with a corresponding gear 632, 634 and 636, which carries rigidly therewith a beveled pinion 638, 640 and 642, said latter beveled pinions in turn engaging beveled pinions 644, 646 and 648 mounted on sleeves 650. Inasmuch as these constructions are all similar, only one need be referred to. These sleeves 650, as shown clearly in Fig. 17, drive another beveled pinion 652, which in turn drives a pinion 654 mounted on a gear 656, which meshes with a gear on the side of the price per gallon dial exactly like gear 608. This gear 608, as before stated, turns with the price per gallon dial 602.

Each of the pawls 377 carried by its arm 370 is adapted to operate with a ratchet 399, each secured to a gear 700 and mounted to rotate together freely on the shaft 363. It will be remembered that the shaft 337 makes one complete counterclockwise rotation for each tenth gallon dispensed at which rotation the rollers 369 carried by the arms 366 to 368 inclusive successively engage their corresponding arms 370 to 372 inclusive to rock these arms clockwise through 90 degrees movement. The pawls 377 travel idly on the smooth peripheries of the segments 378 until the pawls drop off such smooth edges, whereupon said pawls engage and rotate the ratchets 399 therewith an equal distance to the remainder of the travel of the arms 370 to 372 inclusive. For instance, if the price per gallon pawl is set at "5" position, the pawl 377 will pick up the corresponding ratchet 399 and rotate the ratchet and the gear 700 five spaces. When the roller 369 leaves the arm 370 the spring 373 restores said arm to its normal position, the pawl 377 moving idly over the ratchet teeth to its position on the periphery of the segment 378. Each gear 700 for the one cent order (Figs. 19 and 20) has four teeth thereon, 701, which are adapted to mesh with the teeth of a smaller pinion 702 on a sleeve 704. The gears 702 carry a pawl 703 (Figure 22) fastened to their sides and adapted to engage internal ratchet teeth 705 on the hub 707. The drums 707 are fastened to the sleeves 704 carrying on their opposite ends a gear 706 which meshes with a large gear 708 loosely mounted on the shaft 363. Rotation of the gear 700, to the foregoing mentioned gearing, accumulates a tenth of a cent in the said order which is disposed next to the left on the shaft 363 as shown in Fig. 21 and as hereinbefore described with respect to the mechanisms of Figures 4 and 5. Due to the ratchet and pawl connection hereinbefore described, movement of the Geneva gear 700 rotates the small gear 702 and through pawl 703 engaging the internal ratchet on the hub 707, rotates this hub in a counterclockwise direction. The hub being fastened to the sleeve 704, will also rotate the sleeve in a counterclockwise direction and with it the gear 706 meshing with a large gear 708 on a shaft 363. The ratchet drive is utilized in the situation illustrated in order to prevent turning of the gear 702 and hence the Geneva gear 700 when the sleeve 704 is driven in a counterclockwise direction by means of the gear 706 and the large gear 708. This same type of ratchet drive is utilized in the two places indicated in Figure 21 and also in the two places indicated in Figure 4. Similarly the one cent order is transferred and accumulated in the ten cent order through similar mechanism. In order to accumulate the tenths of a cent and the cents into the cents total sales dial, and of course without registering the tenths of a cent in the total sales dial, the following mechanism is provided: By referring to Fig. 21 it will be seen that the last gear 708 of a series of three of these gears is marked 708X. This gear meshes with a smaller gear 710 on a sleeve 712, which rotates freely on shaft 359. This sleeve 712 is rigid with another gear 714 meshing with a larger gear 716 on a shaft 363, which gear 716 meshes with a small gear 718 rotating freely on shaft 376, but having connected thereto a sleeve 720 which carries rigidly therewith a total sales dial 722 carrying on its periphery numerals from zero to 9. This is the total sales dial for the one cent order. In order to accumulate the tenths of a cent order, the cents order and the ten cent order into a total sales dial, (of a ten cent order), the following mechanism is provided:

Gear 700 on shaft 363 is provided with four teeth 701 which mesh at times with its corresponding gear 702, rotating with a sleeve 704 which in turn is provided with its gear 706 meshing with a gear 724 meshing with a smaller gear 726 on a sleeve 728 rotating the total sales dial 729 of a ten cent order.

In order to accumulate the ten cent increments into the total sales dial of the dollar order, the following mechanism is provided: A gear 726 is carried on the beforementioned sleeve 728 and this gear meshes with a gear 724 which drives a four-toothed gear 732 loosely mounted on shaft 363. This four-toothed gear meshes with a smaller gear 734 which caries a sleeve 736 in turn provided with a gear 738 which meshes with a larger gear 740 in turn meshing with a smaller gear 742 on a sleeve 744, which carries with it the dollar order total sales dial 746. Each one of the total sales dials 746, 729 and 722 carries rotatably therewith a gear 748, 750 and 752 which in turn mesh with gears 754, 756 and 758 each carrying a beveled gear 760, 762 and 764 rotating in turn with other bevel gears 766, 768 and 770, which drive sleeves 772 whereby to operate duplicate total sales dials on the opposite side of the clock face.

In order to drive dials for registering the total gallons and fractions thereof, the shaft 337 carries a one-toothed gear 774 which meshes with a gear 778 which in turn drives a four-toothed gear 776 fastened to it, gear 778 in turn meshing with a smaller gear 780 which is fastened to the tenths of a gallon dial 782. Rotation of gear 776 rotates a smaller gear 784 carrying a sleeve 786 provided with a gear 788 which drives gear 790 and this gear in turn drives a gear 792 fastened to the total gallon dial 794. In a similar manner, the gear 790 has fastened to it four-toothed gear 796, which meshes with a smaller gear 798 carrying a sleeve 800 and another pinion 802 which meshes with gear 804 in turn driving a smaller gear 806 for rotating another total gallon dial 808. These provide the three total gallon dials for the tens, units and fractions of a unit. The fractional units of a gallon are preferably indicated as from "0", .1 to .9 of a gallon. Any indicia may be used. In a similar way, each of these total gallon dials by means of gearing illustrated in Fig. 21, drives duplicate sets of total gallon dials on the opposite side of the clock face.

Shaft 337 has a gear 810 thereon which meshes with another gear 812 on shaft 814 driving a worm 816 and a worm gear 818 for driving the total gallon totalizer 820.

The resetting mechanism for this registering mechanism is similar to the construction hereinbefore described.

In order to provide the correct numerical sequence of the figures presented on each of the dials on opposite sides of the clock face when they are driven from a single set of gearing, the usual type of reversing mechanism indicated at 822 (Figure 17) is provided for this purpose.

It is to be understood that whenever the term "registering device" or "registering means" is used, it is intended to include either indicating or recording mechanism.

It is thought that the invention and numerous of its attendant advantages will be understood from the foregoing description, and it is obvious that numerous changes may be made in the form, construction and arrangement of the various parts without departing from the spirit or scope of my invention and without sacrificing any of its attendant advantages, the form herein described being merely for the purpose of illustrating the invention, and I do not desire to limit the invention in any way to the particular construction shown.

I claim:

1. In a machine of the class described, the combination with a liquid dispensing pump, of a meter to measure the liquid, a registering device, power means controlled by the meter to operate the registering device, reset means for the registering device operated by said power means, a dispensing hose and a support therefor, and means operated upon removal of the hose from its support to initiate a resetting operation by said power means.

2. In a device of the class described, the combination with a meter, means for causing flow of liquid therethrough, said meter being adapted to be continuously operated by flow of liquid through said meter, means for controlling flow of liquid through said meter, a prime mover, registering means, a driving connection between the prime mover and the registering means comprising an annular shell adapted to be driven at a relatively high constant speed by the prime mover, an internally disposed cam member having a connection with the registering means, and roller means disposed between the cam member and the inner periphery of the annular shell and connected with the meter so as to be rotated by the meter from a position wherein the roller is out of contact with the rotating shell corresponding to the stationary condition of the meter to a position wherein the roller is wedgingly contacted between the cam means and the inner surface of the shell corresponding to a movable condition of the meter and whereby to drivingly connect the prime mover with the registering means to move said registering means proportionally to the movement of the meter.

3. In a dispensing apparatus, the combination of a discharge nozzle, dispensing means for supplying liquid to said nozzle, a supporting member for supporting the discharge nozzle, power means for driving the dispensing means, registering means, resetting means operable to restore said registering means to its initial indicating position, means operated upon removal of the discharge nozzle from its supporting member to connect said resetting means with said power means to be actuated thereby.

4. In a device of the character described, the combination of registering means, dispensing means, a meter for measuring the liquid dispensed, connecting mechanism between said meter and registering means, means for supplying liquid to said dispensing means, power operated means for actuating said third named means and connected through said connecting mechanism with said registering means, reset mechanism, means whereby said registering means is driven by said power means, and means operated according to a predetermined sequence for resetting the registering means and permitting registering operation thereof.

5. In a dispensing apparatus, the combination of power means, flow establishing means, registering mechanism having an initial indicating position, and adapted to be driven therefrom during a dispensing operation, means for resetting the register to its initial position, an actuatable element, means operated upon actuation of said element to render operative the flow establishing means and to connect said resetting means with said power means to be actuated thereby.

6. In a dispensing apparatus, the combination of registering mechanism, means for resetting the registering mechanism, flow establishing means, electric power means to operate both the resetting means and the flow establishing means, an actuatable element, means operated upon the actuation of said element to simultaneously render operative by said electric power means the resetting means and the flow establishing means.

7. In a liquid dispensing device, a meter for measuring the liquid dispensed, an indicator controlled by said meter, a motor, means actuated by said motor for sequentially driving said indicator under control of said meter during a dispensing operation and for driving said indicator independently of said meter to reset the indicator to zero, and means actuated upon movement of the indicator to zero for terminating a resetting operation.

8. In a liquid dispensing device, the combination of a meter for measuring liquid, an indicator movable away from an initial position in proportion to the quantity of liquid dispensed, a motor, means actuated by the motor for resetting the indicator to said initial position, and means actuated by the motor and rendered operative by return of the indicator to initial position for driving the indicator under the control of the meter to indicate the quantity of liquid dispensed.

9. In a liquid dispensing device, the combination of a meter, an indicator movable away from an initial position in proportion to the quantity of liquid dispensed, means for actuating the indicator in response to operation of a meter and for resetting the indicator to said initial position, and means for controlling the indicator actuating and resetting means to condition the indicator actuating and resetting means for a resetting operation at the conclusion of a dispensing operation and for conditioning the indicator actuating and resetting means for actuating the indicator in response to the operation of the meter during a dispensing operation at the conclusion of a resetting operation.

10. In a liquid dispensing device, a meter for measuring the liquid dispensed, indicating means controlled by said meter movable to indicate the amount of liquid dispensed, a motor, a driving connection between said motor and indicating means for actuating the indicating means during a dispensing operation, another driving connection between said motor and indicator for resetting said indicating means to zero, and means actuated by the motor after the conclusion of a resetting operation for rendering the resetting connection inoperative and the indicator actuating connection operative.

11. In a liquid dispensing device, a meter for measuring the amount of liquid dispensed, an indicator controlled by said meter, a motor, a one-way driving connection between said motor and indicator for driving the indicator in one direction during a dispensing operation, a one-way driving connection between said motor and indicator for resetting the indicator, and means actuated after the conclusion of a resetting operation for rendering the indicator driving connection operative.

12. In a liquid dispensing device, an indicator, a liquid operated meter, first means for driving the indicator in accordance with the operation of the meter, second means for resetting the indicator to zero, driving means for said first and second means, means for initiating operation of said driving means to reset the indicator to zero, and means actuated by the driving means when the indicator reaches zero, to render said second means inoperative, and said first means operative.

13. In a liquid dispensing device, liquid flow establishing means, liquid metering means, an indicator, means connected to the meter and the indicator for moving the indicator away from initial position in accordance with the amount of liquid passing through the metering means, means for returning the indicator to initial position, and means common to the indicator moving and indicator returning means for successively actuating the same.

14. In a liquid dispensing device, a meter, a pump for supplying liquid to said meter, an indicator controlled by said meter, means engageable with and disengageable from said indicator for resetting the latter, a motor for actuating said resetting means, and means operative upon continued operation of said motor after said indicator has been reset for disengaging said resetting means from said indicator.

WILLIAM M. CARROLL.